(12) United States Patent
Kwon

(10) Patent No.: US 10,560,727 B2
(45) Date of Patent: Feb. 11, 2020

(54) SERVER STRUCTURE FOR SUPPORTING MULTIPLE SESSIONS OF VIRTUALIZATION

(71) Applicant: ERMIND CO., LTD, Seoul (KR)

(72) Inventor: Young Min Kwon, Seoul (KR)

(73) Assignee: ERMIND CO., LTD, Seoul (KR)

( * ) Notice: Subject to any disclaimer, the term of this patent is extended or adjusted under 35 U.S.C. 154(b) by 200 days.

(21) Appl. No.: 15/537,381

(22) PCT Filed: Dec. 18, 2015

(86) PCT No.: PCT/KR2015/013910
§ 371 (c)(1),
(2) Date: Oct. 31, 2017

(87) PCT Pub. No.: WO2016/099184
PCT Pub. Date: Jun. 23, 2016

(65) Prior Publication Data
US 2019/0158892 A1  May 23, 2019

(30) Foreign Application Priority Data
Dec. 18, 2014  (KR) ........................ 10-2014-0183104

(51) Int. Cl.
| H04N 21/232 | (2011.01) |
| H04N 21/226 | (2011.01) |
| H04N 21/21 | (2011.01) |
| G06F 9/455 | (2018.01) |
| H04N 21/234 | (2011.01) |

(52) U.S. Cl.
CPC ..... *H04N 21/2326* (2013.01); *G06F 9/45558* (2013.01); *H04N 21/21* (2013.01); *H04N 21/226* (2013.01); *H04N 21/23406* (2013.01); *G06F 2009/45579* (2013.01); *G06F 2009/45583* (2013.01)

(58) Field of Classification Search
None
See application file for complete search history.

(56) References Cited

U.S. PATENT DOCUMENTS

| 2004/0139287 A1 | 7/2004 | Foster et al. |
| 2012/0084774 A1 | 4/2012 | Post et al. |
| 2012/0297382 A1 | 11/2012 | Kim et al. |

FOREIGN PATENT DOCUMENTS

| JP | 2013-210757 A | 10/2013 |
| JP | 2014-500535 A | 1/2014 |

(Continued)

*Primary Examiner* — Omar S Parra

(57) ABSTRACT

A virtualization server is disclosed. The disclosed virtualization server comprises a plurality of CPUs, a plurality of GPUs, a plurality of graphic shared memories, a plurality of streaming CPUs, and a plurality of network cards, and allocates a CPU, a GPU, a graphic shared memory, a streaming CPU, and a network card to each terminal, in consideration of the number of terminals connecting to the virtualization server, the properties of applications executed by the terminals, bandwidths between the virtualization server and the terminals. Since the virtualization server can allocate a resource which matches with the performance required by each terminal, the virtualization server can be flexible to respond to an increase of the number of terminals and efficiently use resources.

7 Claims, 3 Drawing Sheets

(56) References Cited

FOREIGN PATENT DOCUMENTS

| JP | 2014-500535 | * | 12/2014 | | |
| KR | 10-2009-0055459 A | | 6/2009 | | |
| KR | 10-2009-0055459 | * | 12/2011 | ............. | G06F 15/16 |
| KR | 10-2012-0129740 A | | 11/2012 | | |

* cited by examiner

SERVER STRUCTURE FOR SUPPORTING MULTIPLE SESSIONS OF VIRTUALIZATION

CROSS REFERENCE PARAGRAPH

This application is a U.S. National Stage of PCT/KR2015/013910, filed Dec. 18, 2015, which claims the priority benefit of Korean Patent Application No. 10-2014-0183104, filed on Dec. 18, 2014, in the Korean Intellectual Property Office, the disclosures of which are incorporated herein by reference.

BACKGROUND OF THE INVENTION

Technical Field

The following exemplary embodiments relate to a virtualization server, and more particularly, to a structure of a virtualization server that can flexibly handle increase of connectors or loads.

Description of Related Art

With the development of Internet, communication, a digital image, and a smart phone, various fusion services have been launched. However, there are many problems in providing a data service interworking in real time with a broadcasting program image of a digital image. In view of a characteristic of a broadcasting industry, although a service should be simultaneously provided to many viewers, data contents for a bi-directional service are not compatible according to a kind, a performance, and OS of each user terminal and a broadcasting company and thus development of separate contents is required, and as a kind of user terminals is diversified, a cost and time for development of data contents are excessively required and thus there is a limitation in providing an interwork type service and creating a profit.

In order to overcome the problem, a virtualization system has been suggested. The virtualization system executes an application and receives and reproduces a moving picture, and a terminal simply receives and displays only rendered screen data from the virtualization system, and because both development of data contents and development of an application may be performed based on a standardized virtualization system, an inconvenient work can be largely reduced.

SUMMARY OF THE INVENTION

The following exemplary embodiments provide a virtualization server that can flexibly handle increase of connectors or loads.

In accordance with an exemplary embodiment, a virtualization server includes a central processing unit (CPU) bank including a plurality of CPUs; a graphic processing unit (GPU) bank including a plurality of GPUs; a graphic sharing memory (GSM) bank including a plurality of graphic sharing memories; a streaming CPU bank including a plurality of streaming CPUs; a network card bank including a plurality of network cards; and a host CPU that selects at least one CPU from the CPU bank and that selects at least one GPU from the GPU bank and that selects at least one GSM from the GSM bank and that selects at least one streaming CPU from the streaming CPU bank and that selects at least one network card from the network card bank according to access of the terminal, wherein the selected CPU executes an application according to a request of the terminal, the selected GPU renders a screen of the executed application to store the rendered screen at the GSM, the selected streaming CPU captures the rendered screen stored at the GSM to convert the captured screen to a packet for streaming, the selected network card transmits the converted packet to the accessed terminal, and the packet transmitted to the terminal is used for displaying a screen of the application in the display device of the terminal.

Further, the host CPU may determine the number of the selecting CPUs and the number of the selecting GPUs in consideration of a characteristic of the application, a use amount of the each CPU, and a use amount of the each GPU.

Further, the characteristic of the application may include at least one of a calculation amount of the application, a memory use amount of the application, and a resolution of the application.

Further, the selected CPU may receive information about an input device of the terminal from the terminal and execute the application according to control information input by the input device with reference to information about the input device.

The host CPU may select the network card according to a bandwidth between the virtualization server and the terminal and latency between the virtualization server and the terminal.

Further, the selected streaming CPU may convert the rendered screen to a packet for the streaming using H.264 Codec or convert voice data of the executed application to a packet for the streaming using AAC Codec.

Further, the selected GSM may correspond to the selected CPU to store a screen rendered by each of the selected plurality of CPUs at the selected GSM.

Advantages

According to the following exemplary embodiments, a virtualization server can flexibly handle increase of connectors or loads.

According to the following exemplary embodiments, by using special hardware for virtualization, even in a case in which a use amount rapidly increases, hardware can be efficiently dynamically divided and used.

According to the following exemplary embodiments, a user's large request can be coped with a small scale hardware investment.

DETAILED DESCRIPTION OF THE INVENTION

In accordance with an exemplary embodiment, a virtualization server includes a central processing unit (CPU) bank including a plurality of CPUs; a graphic processing unit (GPU) bank including a plurality of GPUs; a graphic sharing memory (GSM) bank including a plurality of graphic sharing memories; a streaming CPU bank including a plurality of streaming CPUs; a network card bank including a plurality of network cards; and a host CPU that selects at least one CPU from the CPU bank and that selects at least one GPU from the GPU bank and that selects at least one GSM from the GSM bank and that selects at least one streaming CPU from the streaming CPU bank and that selects at least one network card from the network card bank according to access of the terminal, wherein the selected CPU executes an application according to a request of the terminal, the selected GPU renders a screen of the executed application to store the rendered screen at the GSM, the selected streaming CPU captures the rendered screen stored at the GSM to convert the captured screen to a packet for streaming, the selected network card transmits the converted packet to the accessed terminal, and the packet transmitted to the terminal is used for displaying a screen of the application in the display device of the terminal.

Further, the host CPU may determine the number of the selecting CPUs and the number of the selecting GPUs in consideration of a characteristic of the application, a use amount of the each CPU, and a use amount of the each GPU.

Further, the characteristic of the application may include at least one of a calculation amount of the application, a memory use amount of the application, and a resolution of the application.

Further, the selected CPU may receive information about an input device of the terminal from the terminal and execute the application according to control information input by the input device with reference to information about the input device.

The host CPU may select the network card according to a bandwidth between the virtualization server and the terminal and latency between the virtualization server and the terminal.

Further, the selected streaming CPU may convert the rendered screen to a packet for the streaming using H.264 Codec or convert voice data of the executed application to a packet for the streaming using AAC Codec.

Further, the selected GSM may correspond to the selected CPU to store a screen rendered by each of the selected plurality of CPUs at the selected GSM.

Hereinafter, an exemplary embodiment will be described in detail with reference to the accompanying drawings.

Figure 1:
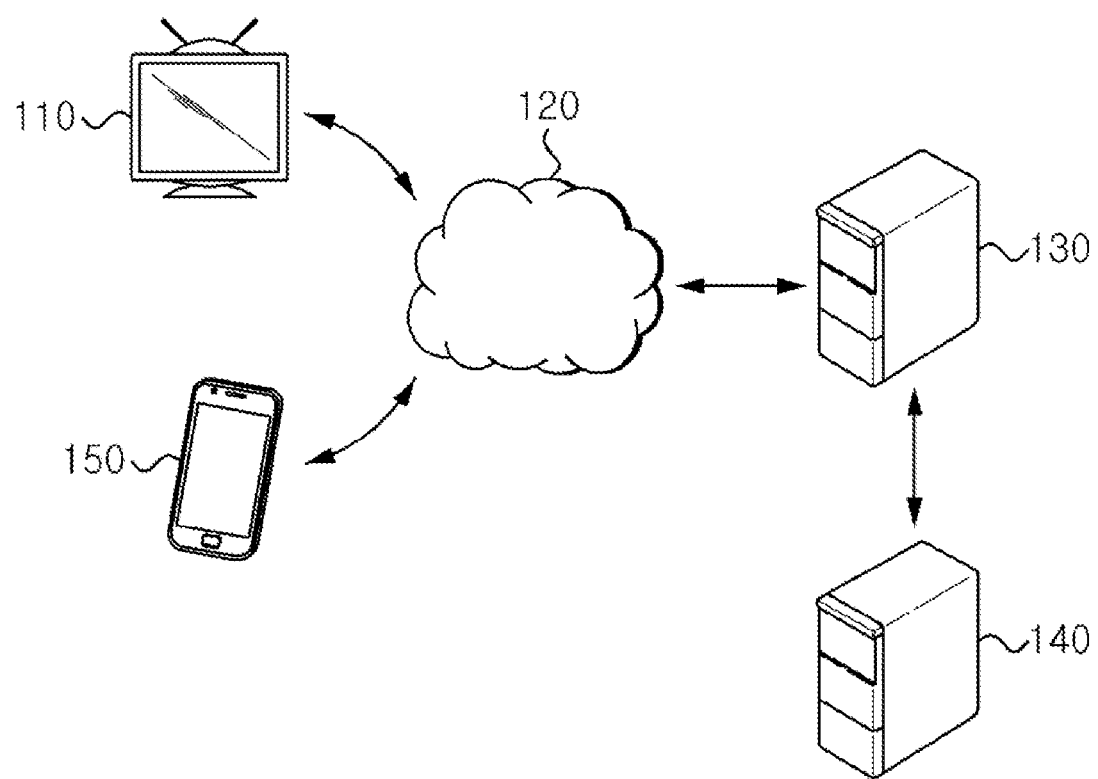
FIG. 1 is a diagram illustrating an IPTV service providing to a plurality of terminals using a virtualization server according to an exemplary embodiment.

FIG. 1 is a diagram illustrating an IPTV service providing to a plurality of terminals using a virtualization server according to an exemplary embodiment.

A virtualization server 130 receives data from a data server 140. Here, data in which the virtualization server 130 receives from the data server 140 may include moving picture streaming data for an IPTV broadcasting service, application data for a game service, and web data for a web service.

The virtualization server 130 is a very strong machine that mounts a plurality of Central Processing Units (CPUs), a plurality of Graphic Processing Units (GPUs), and a large capacity memory. The virtualization server 130 generates a virtual machine for each of terminals 110 and 150 using a strong processing performance. Each virtual machine streams IPTV broadcasting, drives a game application, or performs web browsing using received data.

Each virtual machine generates screen data that reflect an executed service such as IPTV broadcasting, game, and web browsing. The screen data generated by each virtual machine are stored at a graphic memory within the virtualization server 130.

The virtualization server 130 captures screen data stored at the graphic memory to convert the captured screen data to a packet for streaming. According to an exemplary embodiment, the virtualization server 130 may convert screen data to a packet using Codec such as H.264.

The virtualization server 130 may transmit the converted packet to the terminals 110 and 150 via a communication network 120. In this case, each of the terminals 110 and 150 receives the converted packet and restores screen data from the converted packet. The restored data are used for displaying a screen in which an application such as IPTV, game, and web browser is executed in a display device connected to each of the terminals 110 and 150.

According to an exemplary embodiment described with reference to FIG. 1, the application is executed in a virtual machine generated in the virtualization server 130. A screen in which an application is executed is converted to a packet, and the packet is transmitted to each of the terminals 110 and 150. The each of the terminals 110 and 150 may not directly execute an application, but display a screen in which the application is executed.

Because the each of the terminals 110 and 150 does not directly execute an application, a high quality of service may be provided to the each of the terminals 110 and 150 regardless of a performance of the each of the terminals 110 and 150.

When the terminals 110 and 150 access to the virtualization server 130, the virtualization server 130 selects a computing resource thereof such as a plurality of CPUs and a plurality of GPUs to configure a virtual machine. The configured virtual machine is driven using the selected CPU and GPU. The virtual machine receives a control signal from the terminals 110 and 150 and executes an application according to the received control signal. Information about a screen in which an application is executed in the virtual machine may be referred to as screen data. The virtual machine stores screen data at a graphic memory. The virtual machine converts screen data stored at the graphic memory to the packet and transmits the packet to the terminals 110 and 150.

When the number of terminals 110 and 150 accessed to the virtualization server 130 increases, the virtualization server 130 may increase the number of the virtual machines to provide a service for the each of the terminals 110 and 150. Therefore, even when the number of terminals 110 and 150 increases or even when a load caused by the each of the terminals 110 and 150 largely increases, the virtualization server 130 may flexibly provide a service.

Figure 2:
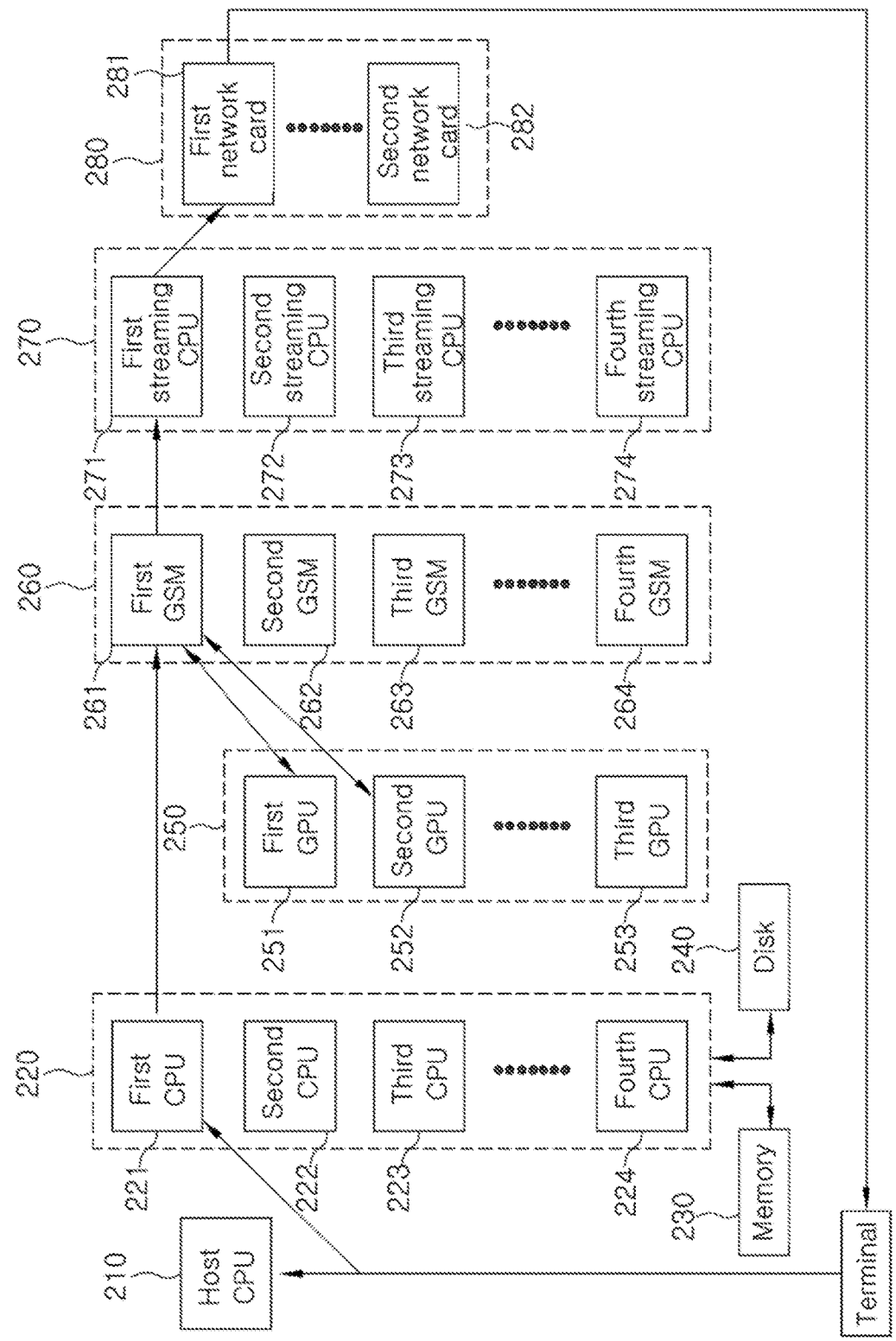
FIG. 2 is a block diagram illustrating a structure of a virtualization server according to an exemplary embodiment.

FIG. 2 is a block diagram illustrating a structure of a virtualization server according to an exemplary embodiment. A virtualization server 200 according to an exemplary embodiment may include a host CPU 210, a CPU bank 220, a GPU bank 250, a graphic sharing memory (GSM) bank 260, a streaming CPU bank 270, a network card bank 280, a memory 230, and a disk 240. Here, the CPU bank 220 includes a plurality of CPUs 221, 222, 223, and 224, the GPU bank 250 includes a plurality of GPUs 251, 252, and 253, and the GSM bank 260 includes a plurality of graphic sharing memories 261, 262, 263, and 264. Further, the streaming CPU bank 270 includes a plurality of streaming CPUs 271, 272, 273, and 274, and the network card bank 280 includes a plurality of network cards 281 and 282.

The host CPU 210 receives an access request from a terminal. According to an exemplary embodiment, an access request from the terminal may include information about an application to be executed by the terminal.

The host CPU 210 configures a virtual machine according to an access request from the terminal. According to an exemplary embodiment, the host CPU 210 may select a computing resource for driving the virtual machine such as selection of a CPU in the CPU bank 220 and selection of a GPU in the GPU bank 250. The host CPU 210 may map a selected computing resource to the corresponding virtual machine to process a computing load necessary for the virtual machine.

According to an exemplary embodiment, the host CPU 210 selects at least one CPU in the CPU bank 220. According to an exemplary embodiment, the host CPU 210 may select a CPU in consideration of a characteristic of an application in which the terminal is to execute and a use amount of CPUs 221, 222, 223, and 224 included in the CPU bank 220.

According to an exemplary embodiment, the host CPU 210 selects at least one GPU in the GPU bank 250. According to an exemplary embodiment, the host CPU 210 may select a GPU in consideration of a characteristic of an application in which the terminal is to execute and a use amount of GPUs 251, 252, and 253 included in the GPU bank 250.

Here, a characteristic of an application in which the host CPU considers when selecting a CPU and a GPU may include at least one of a calculation amount of an application in which the terminal is to execute, a memory use amount of an application, and a resolution of an application.

For example, when the terminal executes an application of a less calculation amount such as a word processor, the host CPU 210 may select only one CPU or may select a CPU that performs a portion of calculation by another virtual machine. However, when the terminal executes an application having a much calculation amount such as moving picture reproduction, the host CPU 210 may select a plurality of CPUs or may select a CPU that does not perform calculation by another virtual machine.

For example, when the terminal executes an application having a less calculation amount of a GPU such as a word processor, the host CPU may select only one GPU or may select a GPU that performs a portion of calculation by another virtual machine. However, when the terminal executes an application having a much calculation amount of a GPU such as a game, the host CPU 210 may select a plurality of GPUs or may select a GPU that does not perform calculation by another virtual machine.

Further, when a resolution of an application in which the terminal is to execute is HD 720p, the host CPU may select only one GPU, but when a resolution of an application is FHD 1080p, the host CPU may select a plurality of GPUs.

The selected CPU receives information about an input device of the terminal from the terminal. The information about input device of the terminal represents whether the terminal is manipulated using a device having large latency like a remote control, whether the terminal has an input device for manipulation of a game like a joystick, and whether the terminal has an input device for typing like a hardware keyboard. The selected CPU may execute an application according to control information input from the input device with reference to information about the input device.

The host CPU 210 additionally selects a GSM, a streaming CPU, and a network card. The CPU 221, the GPUs 251 and 252, the GSM 261, the streaming CPU 271, and the network card 281 selected by the host CPU 210 are mapped to the virtual machine that executes an application required by the terminal.

The selected CPU 221 is mapped to the virtual machine to execute an application required by the terminal. Further, the selected GPU 251 may render a screen according to the executed application to generate screen data. The selected GPU 251 stores the generated screen data at the selected GSM 261. As shown in FIG. 2, when two GPUs 251 and 252 are selected for one CPU 221, each of the GPUs 251 and 252 may store screen data at one GSM 261.

The selected streaming CPU 271 may capture a rendered screen stored at a GSM and convert the captured screen to a packet for streaming. According to an exemplary embodiment, the streaming CPU 271 may convert the rendered screen using H.264 Codec. Alternatively, the streaming CPU 271 may convert voice data of an executed application using AAC Codec to a packet for streaming.

According to an exemplary embodiment described with reference to FIG. 2, the CPU 221 that executes an application and the streaming CPU 271 that converts to a packet are physically divided about the GSM 261. Therefore, the CPU 221 that executes an application is not related to a calculation amount of Codec driven in the streaming CPU 271.

Because the CPU 221 that executes an application can concentrate only on execution of the application, a performance of the virtualization server is enhanced, and the host CPU 210 may select the CPU 221 without considering a calculation amount of Codec.

The network card 281 transmits a converted packet to the terminal through a communication network. According to an exemplary embodiment, the host CPU 210 may select a network card according to a bandwidth between the virtualization server 200 and the terminal or latency between the virtualization server 200 and the terminal. For example, when a bandwidth between the virtualization server 200 and the terminal is smaller than a reference bandwidth or when latency between the virtualization server 200 and the terminal is larger than a reference time, the host CPU 210 may select a plurality of network cards.

The network card 281 may transmit the converted packet to the terminal. The terminal may receive the converted packet and recover a screen in which an application is executed with the received packet. The terminal may be connected to the display device and display a screen in which an application is executed through the connected display device.

According to an exemplary embodiment described with reference to FIG. 2, the virtualization server 200 selects a computing resource according to a characteristic of an application in which an accessing terminal is to execute and generates a virtual machine using the selected computing resource. Here, the virtualization server 200 may allocate a computing resource allocated to a first virtual machine to a second virtual machine. Therefore, even when the number of terminals accessing to the virtualization server 200 increases, the virtualization server may flexibly handle.

Further, when a performance of the terminal is insufficient to execute a specific application, a corresponding application is executed in the virtualization server 200, and the terminal may stream and reproduce only a screen in which the application is executed. Therefore, even when a performance of the terminal is insufficient, a service may be provided through the terminal.

Because the CPU 221 that executes an application and the streaming CPU 271 that converts a rendered screen to a packet are separated about the GSM 261, the CPU 221 that executes an application may perform only execution of the application regardless of a calculation amount of a Codec.

According to an exemplary embodiment, the graphic sharing memories 261, 262, 263, and 264 may correspond to the selected CPU. A configuration in which the graphic sharing memories 261, 262, 263, and 264 correspond to the CPU will be described in detail with reference to FIG. 3.

Figure 3:
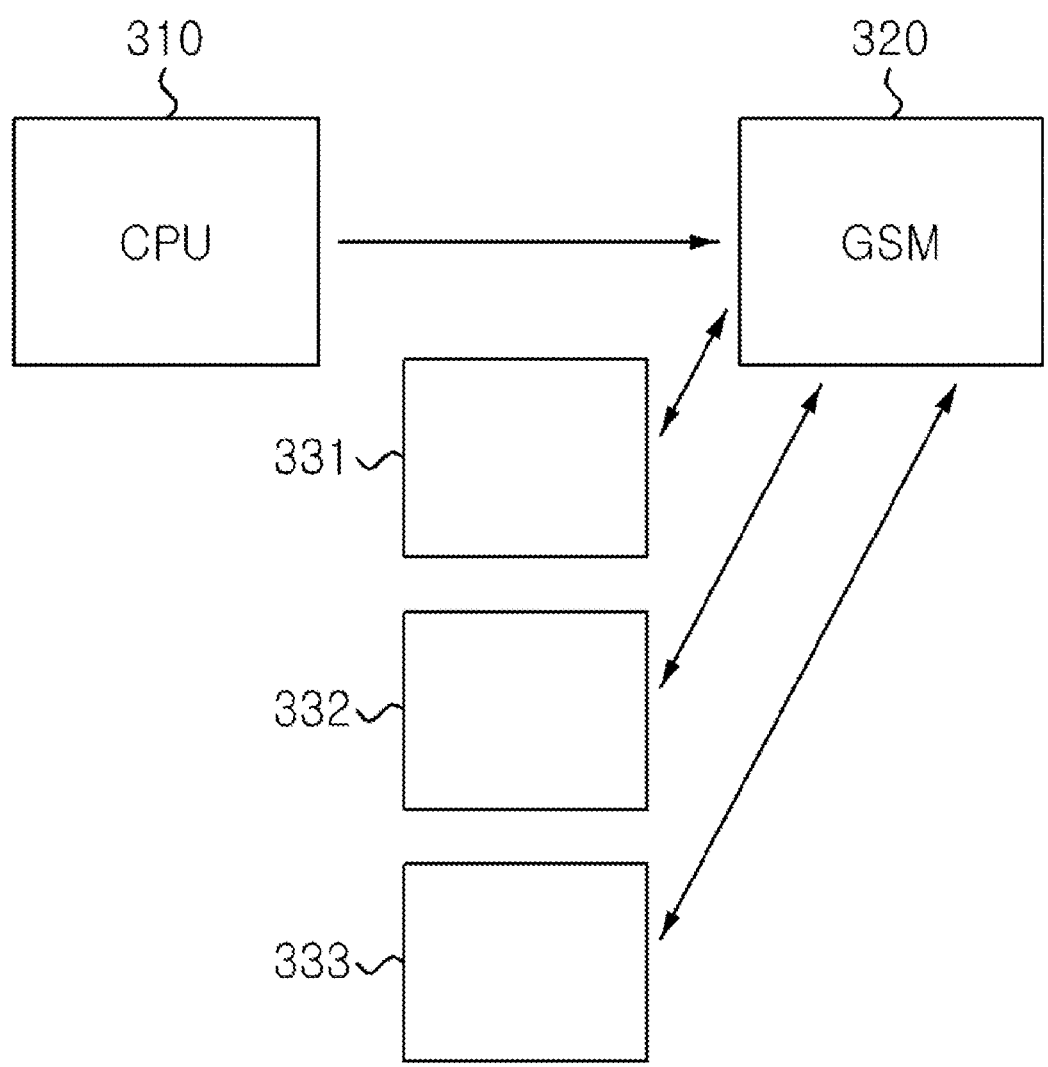
FIG. 3 is a block diagram illustrating a structure of a virtualization server according to another exemplary embodiment.

FIG. 3 is a block diagram illustrating a structure of a virtualization server according to another exemplary embodiment.

In FIG. 3, a GSM 320 corresponds to each CPU 310. Therefore, when a host CPU (not shown in FIG. 3) selects one CPU 310, selected GPUs 331, 332, and 333 store the entire of rendered screen data at the GSM 320.

Further, when the CPU 310 is mapped to several virtual machines, the CPU executes each of a plurality of applications in which several virtual machines should execute, and in this case, the entire of screen data according to each application are stored at the GSM 320.

Methods according to an exemplary embodiment may be implemented into a program command form that may be performed through various computer means to be recorded in a computer readable medium. The computer readable medium may include a program command, a data file, and a data structure in single or in combination. The program command recorded at the medium may be specially designed and configured for an exemplary embodiment or may be known to and used by a person of ordinary skill in the computer software. The computer readable recording medium may include, for example, magnetic media such as a hard disk, a floppy disk, and a magnetic tape, optical media such as a Compact Disk Read-Only Memory (CD-ROM) or a Digital Versatile Disk (DVD), magnetic-optical media such as a floptical disk, and a hardware device, specially configured to store and execute a program command, such as a ROM, a Random-Access Memory (RAM), and a flash memory. The program command may include, for example, a high-level language code that may be executed by a computer using an interpreter as well as a machine language code formed by a compiler. In order to perform operation of an exemplary embodiment, the above-described hardware device may be configured to operate as at least one software module and vice versa.

Although exemplary embodiments have been described in detail hereinabove, it should be clearly understood that many variations and modifications of the basic inventive concepts herein described, which may appear to those skilled in the art, will still fall within the spirit and scope of the exemplary embodiments of the present disclosure as defined in the appended claims. For example, even if described technologies are performed in order different from a described method, and/or constituent elements such as a described system, structure, device, and circuit are coupled or combined in a form different from that of a described method, or are replaced or substituted with another constituent element or equivalent, an appropriate result can be achieved.

Therefore, other implementations, other exemplary embodiments, and equivalents to claims will still fall within the spirit and scope of the appended claims.

INDUSTRIAL APPLICABILITY

A virtualization server is disclosed. The disclosed virtualization server includes a plurality of CPUs, a plurality of GPUs, a plurality of graphic sharing memories, a plurality of streaming CPUs, and a plurality of network cards, and allocates a CPU, a GPU, a GSM, a streaming CPU, and a network card to each terminal in consideration of the number of terminals accessing to the virtualization server, an attribute of an application in which the terminal executes, and a bandwidth between the virtualization server and the terminal. Because a resource can be allocated to correspond to a requiring performance of each terminal, even when accessing terminals increase, the virtualization server can flexibly handle and efficiently use a resource.

What is claimed is:

1. A virtualization server, comprising:
a central processing unit (CPU) bank comprising a plurality of CPUs;
a graphic processing unit (GPU) bank comprising a plurality of GPUs;
a graphic sharing memory (GSM) bank comprising a plurality of graphic sharing memories;
a streaming CPU bank comprising a plurality of streaming CPUs;
a network card bank comprising a plurality of network cards; and
a host CPU configured to select at least one CPU from the CPU bank, select at least one GPU from the GPU bank, select at least one GSM from the GSM bank, select at least one streaming CPU from the streaming CPU bank, and select at least one network card from the network card bank according to access of a terminal,
wherein the selected CPU executes an application according to a request of the terminal, the selected GPU renders a screen of the executed application to store the rendered screen at the selected GSM, the selected streaming CPU captures the rendered screen stored at the selected GSM to convert the captured screen to a packet for streaming, the selected network card transmits the converted packet to the terminal via a communication network, and the packet transmitted to the terminal is used for displaying the screen of the executed application on a display device of the terminal, and
wherein, when the host CPU selects one CPU from the CPU bank and the selected CPU is mapped to a plurality of virtual machines, the selected one CPU executes each of a plurality of applications in which the plurality of virtual machines execute, the host CPU selects a multiplicity of GPUs from the GPU bank and selects one GSM corresponding to the selected one CPU from the GSM bank, and the selected multiplicity of GPUs render and store screen data according to each of the plurality of applications at the selected one GSM.

2. The virtualization server of claim 1, wherein the host CPU determines the number of CPUs to be selected and the number of GPUs to be selected, in consideration of a characteristic of the application, a use amount of each of the plurality of CPUs, and a use amount of each of the plurality of GPUs.

3. The virtualization server of claim 2, wherein the characteristic of the application comprises at least one of a calculation amount of the application, a memory use amount of the application, and a resolution of the application.

4. The virtualization server of claim 1, wherein the selected CPU receives information about an input device of the terminal from the terminal and executes the application according to control information input by the input device with reference to the information about the input device.

5. The virtualization server of claim 1, wherein the host CPU selects the network card according to a bandwidth between the virtualization server and the terminal and latency between the virtualization server and the terminal.

6. The virtualization server of claim 1, wherein the selected streaming CPU converts the rendered screen to a packet for the streaming using H.264 Codec or converts voice data of the executed application to a packet for the streaming using AAC Codec.

7. The virtualization server of claim 1, wherein the selected one GSM corresponds to the selected one CPU to store screen data rendered by each of the selected multiplicity of GPUs at the selected one GSM.

* * * * *